United States Patent
Shibayama

[11] Patent Number: 5,793,531
[45] Date of Patent: Aug. 11, 1998

[54] ZOOM LENS

[75] Inventor: Atsushi Shibayama, Tokyo, Japan

[73] Assignee: Nikon Corporation, Tokyo, Japan

[21] Appl. No.: 748,419

[22] Filed: Nov. 13, 1996

[30] Foreign Application Priority Data

Nov. 28, 1995 [JP] Japan .................. 7-350704

[51] Int. Cl.$^6$ .................................................. G02B 15/14
[52] U.S. Cl. ........................................ 359/686; 359/683
[58] Field of Search ................................ 359/683, 686

[56] References Cited

U.S. PATENT DOCUMENTS

| | | |
|---|---|---|
| 3,603,669 | 9/1971 | Lai et al. |
| 4,054,371 | 10/1977 | Yasukuni ..................... 359/686 |
| 4,653,873 | 3/1987 | Kawamura ................... 359/686 |
| 5,132,848 | 7/1992 | Nishio et al. ................ 359/686 |
| 5,631,775 | 5/1997 | Shibata ........................ 359/686 |

Primary Examiner—Scott J. Sugarman
Attorney, Agent, or Firm—Oliff & Berridge, PLC

[57] ABSTRACT

A zoom lens is provided that is capable of focusing from infinity to an extremely close range, on the order of −0.5 magnification, in all zoom positions with adequate peripheral light amounts and good imaging performance. The zoom lens includes, in the following order, from the object side: a first lens group having a negative refractive power; a second lens group having a positive refractive power; a third lens group having a negative refractive power; and a fourth lens group having a positive refractive power. Zooming from the maximum wide-angle state to the maximum telephoto state is accomplished with the first lens group in a fixed state and the distance between the first lens group and the second lens group decreasing, the distance between the second lens group and the third lens group increasing, and the distance between the third lens group and the fourth lens group decreasing. Focusing from an object at infinity to a close object is accomplished by moving the first lens group toward the object, and satisfying the equations:

$$0.6 < |f_1/f_w| < 1.2 \quad (1)$$

$$0.7 < f/f_{12t} < 1.5 \quad (2)$$

where $f_w$ is the focal length of the entire zoom lens system at the maximum wide-angle state in an infinite focus state, $f_t$ is the focal length of the entire system at the maximum telephoto state in an infinite focus state, $f_1$ is the focal length of the first lens group, and $f_{12t}$ is the combined focal length of the first lens group and the second lens group at the maximum telephoto state in an infinite focus state.

11 Claims, 15 Drawing Sheets

SPHERICAL ABERRATION
F_NO =4.00

ASTIGMATISM
Y=21.60

DISTORTION
Y=21.60

LATERAL CHROMATIC ABERRATION

SPHERICAL
ABERRATION
$F_{NO} = 4.00$ 0.500

ASTIGMATISM
Y=21.60

0.500

DISTORTION
Y=21.60

3.000%

−0.100

LATERAL CHROMATIC ABERRATION

LATERAL CHROMATIC ABERRATION

LATERAL CHROMATIC ABERRATION

SPHERICAL ABERRATION
NA=0.12

ASTIGMATISM
Y=21.60

DISTORTION
Y=21.60

LATERAL CHROMATIC ABERRATION

SPHERICAL ABERRATION
NA=0.12

ASTIGMATISM
Y=21.60

DISTORTION
Y=21.60

LATERAL CHROMATIC ABERRATION

LATERAL CHROMATIC ABERRATION

SPHERICAL ABERRATION
F_NO=4.10

ASTIGMATISM
Y=21.60

DISTORTION
Y=21.60

LATERAL CHROMATIC ABERRATION

SPHERICAL ABERRATION
$F_{NO} = 4.09$ 0.500

ASTIGMATISM
Y=21.60

0.500

DISTORTION
Y=21.60

3.000%

-0.100

LATERAL CHROMATIC ABERRATION

LATERAL CHROMATIC ABERRATION

SPHERICAL
ABERRATION
NA=0.12

0.500

ASTIGMATISM
Y=21.60

0.500

DISTORTION
Y=21.60

3.000%

LATERAL CHROMATIC ABERRATION

ZOOM LENS

BACKGROUND OF THE INVENTION

1. Field of the Invention

The present invention relates to a zoom lens used in a single lens reflex camera, and more particularly, to a zoom lens capable of focusing from infinity to extremely close range in all zoom positions.

2. Description of Related Art

Conventionally, a so-called macro-lens capable of focusing from infinity to the extremely close range of a photographic magnification on the order of −0.5 has been provided for use in single lens reflex cameras.

In addition, even among zoom lenses, a zoom lens has been provided called a macro-mechanism to which a function capable of photographing at shorter distances than the normal shortest object distance has been added.

Or, a close-up lens mounted on the object side of the shooting lens has been provided for the purpose of shortening the shortest object distance.

However, all of the conventional macro-lenses have been single focus lenses, and in order to change the photographic magnification, it was necessary to change the distance between the object and the camera at the same time to perform a focusing operation. Consequently, alteration of the composition when taking photographs of close range objects using a tripod was difficult.

In addition, the majority of macro-mechanisms in zoom lenses can be used only at either the maximum wide-angle state (so-called wide macros) or at the maximum telephoto state (so-called tele-macros) and zooming cannot be accomplished during macro photography. Consequently, the operability was the same as or worse than that of a single focus macro-lens.

In the macro-mechanism of some zoom lenses, there is the possibility of close-range photography in all zoom positions, but the maximum photographic magnification is on the order of −0.25, and these mechanisms are inadequate in meeting the desire for macrophotography.

In addition, when accessories such as a close-up lens or the like are used, mounting and removing the accessory is necessary when accomplishing photography at a far object distance and when accomplishing photography at a close object distance, which is cumbersome.

Among focusing methods for zoom lenses, besides methods that cause the first lens group to move, there is an inner focus method and a rear focus method. However, in the case of the inner focus method or the rear focus method, the problem arises that the focal point position deviates when zooming is accomplished in a state with focusing accomplished at close range. Furthermore, it is necessary to provide a space in the optical path for the focusing lens to move, and enlargement of the zoom lens cannot be avoided when the displacement of the focusing lens is large in order to accomplish ultra-close range photography.

In addition, even in the case of a focusing method that causes the first lens group to move, there is a case where the refractive power of the first lens group is positive and a case where this is negative.

In the case wherein the refractive power of the first lens group is positive, the angle at which the off-axis principal light rays (light rays passing through the center of the diaphragm) exit the first lens group is larger than the angle at which these light rays are incident, as shown in FIG. 1A. Accordingly, when the first lens group is caused to move toward the object in order to accomplish focusing, the required effective diameter of the first lens group increases dramatically.

On the other hand, in the case wherein the refractive power of the first lens group is negative, the angle at which the off-axis principal light rays exit the first lens group is smaller than the angle at where these light rays are incident, as shown in FIG. 1B. Accordingly, when the first lens group is caused to move toward the object in order to accomplish focusing, the required effective diameter of the first lens group does not increase as much.

In addition, there are zoom lenses in which the first lens group moves during zooming and zoom lenses in which the first lens group does not move during zooming, but in the zoom lenses in which the first lens group moves during zooming, when zooming is accomplished during ultra-close range photography the distance from the object to the tip of the zoom lens changes and discrepancies in the focal point position are created.

SUMMARY OF THE INVENTION

The present invention resolves the above problems by using a first lens group having the following characteristics. When the displacement of the first lens group is large in order to accomplish ultra-close range photography, it is preferable for the refractive power of the first lens group to be negative. Hence, in the zoom lens of the invention capable of ultra-close range photography, focusing is accomplished by moving a negative first lens group. Moreover, in the zoom lens of the invention capable of ultra-close range photography, the first lens group is fixed during zooming.

The zoom lens of the invention is capable of ultra-close range photography and suited for a single lens reflex camera in which zooming is possible in all object distances from infinity to ultra-close object distances, while there is no discrepancy in the focal point position even when zooming is conducted at any of the object distances. Furthermore, a maximum photographic magnification on the order of −0.5, a zoom ratio of around 2, and an F number of around F/4 can be obtained, while having adequate peripheral light amounts and good imaging performance in all photographic states.

These characteristics are obtained by a zoom lens comprising, in the following order from the object side: a first lens group having a negative refractive power; a second lens group having a positive refractive power; a third lens group having a negative refractive power; and a fourth lens group having a positive refractive power. Zooming from the maximum wide-angle state to the maximum telephoto state is accomplished with the first lens group in a fixed state, a distance between the first lens group and the second lens group decreasing, a distance between the second lens group and the third lens group increasing, and the distance between the third lens group and the fourth lens group decreasing. Focusing from an object at infinity to a close object is accomplished by moving the first lens group toward the object, and satisfying the equations:

$$0.6 < |f_1/f_w| < 1.2 \tag{1}$$

$$0.7 < f/f_{12} < 1.5 \tag{2}$$

where $f_w$ is the focal length of the entire zoom lens at the maximum wide-angle state in an infinite focus state, $f_t$ is the focal length of the entire zoom lens at the maximum telephoto state in an infinite focus state, $f_1$ is the focal length of the first lens group, and $f_{12t}$ is the combined focal length of the first lens group and the second lens group at the maximum telephoto state in an infinite focus state.

Condition equation (1) indicates the appropriate range for the focal length of the first lens group. When the upper limit in condition equation (1) is exceeded, the displacement of the first lens group during focusing becomes large and when the attempt is made to accomplish ultra-close range photography, the zoom lens becomes larger. Conversely, when the lower limit in condition equation (1) is breached, the aberrations created by the first lens group increase and aberration fluctuations are created accompanying zooming and focusing.

Condition equation (2) indicates the appropriate range for the combined focal length of the first lens group and the second lens group in an infinite focus state in the maximum telephoto state. When the upper limit in condition equation (2) is exceeded, the total length of the zoom lens system increases. Conversely, when the lower limit in condition equation (2) is breached, the imaging magnification of the lens groups from the third lens group to the fourth lens group increases at the maximum telephoto state, causing aberrations created by the first lens group and the second lens group to enlarge, thus making it difficult for good image performance to be obtained.

In the invention, the second lens group comprises, in the following order, from the object side: a number 2-1 lens group having a positive refractive power; and a number 2—2 lens group having a positive refractive power. When zooming, the distance between the number 2-1 lens group and the number 2—2 lens group is caused to change. Through this lens composition, it is possible to better correct aberration fluctuations during focusing.

In addition, in the invention it is preferable to satisfy the equation:

$$0.4 < h_{2w}/h_{1w} < 0.9 \quad (3)$$

where $h_{1w}$ is the height of the principal light rays having the largest field angle from the optical axis that passes through the surface of the first lens group closest to the image side at the maximum wide-angle state in an infinite focus state, and $h_{2w}$ is the height of the principal light rays having the largest field angle from the optical axis that passes through the surface of the second lens group closest to the object side at the maximum wide-angle state in an infinite focus state.

Condition equation (3) indicates the appropriate range for the ratio between the height of the principal light rays having the largest field angle from the optical axis that passes through the surface of the second lens group closest to the object side at the maximum wide-angle state in an infinite focus state and the height of the principal light rays having the largest field angle from the optical axis that passes through the surface of the first lens group closest to the image side at the maximum wide-angle state in an infinite focus state. When the lower limit in condition equation (3) is breached, inadequacy in the peripheral light amount during focusing on close range objects at the maximum wide-angle state or enlargement of the first lens group are caused. Conversely, when the upper limit in condition equation (3) is exceeded, the second lens group becomes larger and the zoom cam barrel and zoom lens diameter become larger.

In addition, in the present invention it is preferable to satisfy the equation:

$$1.0 < f_4/f_w < 2.0 \quad (4)$$

where $f_4$ is the focal length of the fourth lens group.

Condition equation (4) indicates the appropriate range for the focal length of the fourth lens group. When the upper limit in condition equation (4) is exceeded, the back focus of the zoom lens becomes too short, making mounting on a single lens reflex camera difficult. Conversely, when the lower limit in condition equation (4) is breached, the total length of the zoom lens system becomes larger.

The invention is also a zoom lens comprising, in the following order, from the object side: a first lens group having a negative refractive power; a number 2-1 lens group having a positive refractive power; a number 2—2 lens group having a positive refractive power; a third lens group having a negative refractive power; and a fourth lens group having a positive refractive power. Zooming from the maximum wide-angle state to the maximum telephoto state is accomplished with the first lens group in a fixed state, the distance between the first lens group and the number 2-1 lens group decreasing, the distance between the number 2-1 lens group and the number 2—2 lens group being caused to change, the distance between the number 2—2 lens group and the third lens group increasing, and the distance between the third lens group and the fourth lens group decreasing. Focusing from an object at infinity to a close object is accomplished by moving the first lens group toward the object.

With the invention, a zoom lens capable of ultra-close range photography and suited for a single lens reflex camera is provided in which zooming is possible in all object distances from infinity to ultra-close object distances, while there is no discrepancy in the focal point position even when zooming is conducted at any of the object distances. Furthermore, a maximum photographic magnification on the order of −0.5, a zoom ratio of around 2, and an F number of around F/4 can be obtained, with adequate peripheral light amounts and good imaging performance in all photographic states.

DETAILED DESCRIPTION OF PREFERRED EMBODIMENTS

Figure 1A:
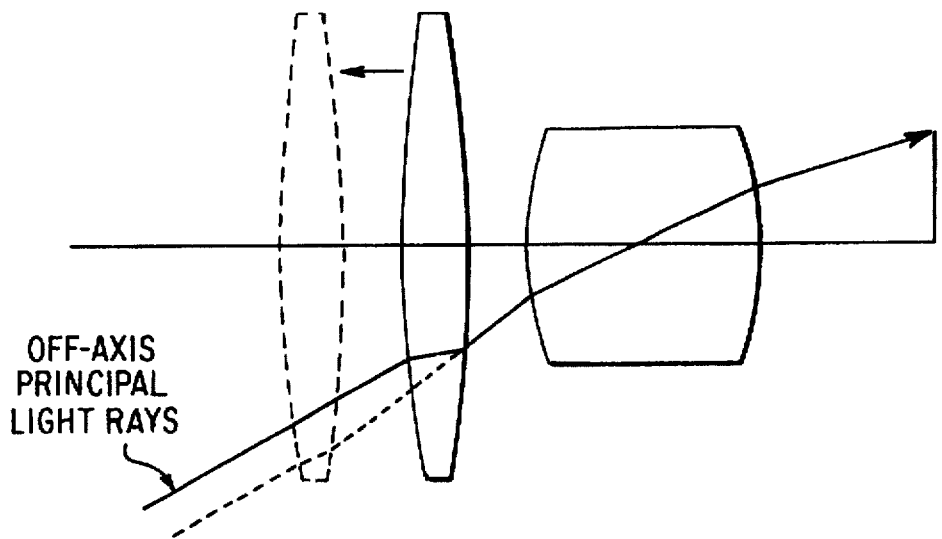
FIGS. 1A and 1B are schematic diagrams used to explain the operation of the present invention.
Figure 1B:
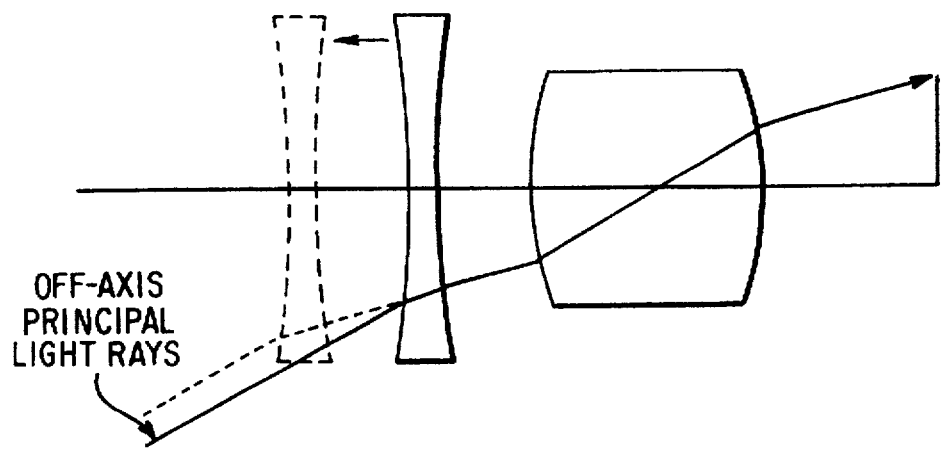
Figure 2:
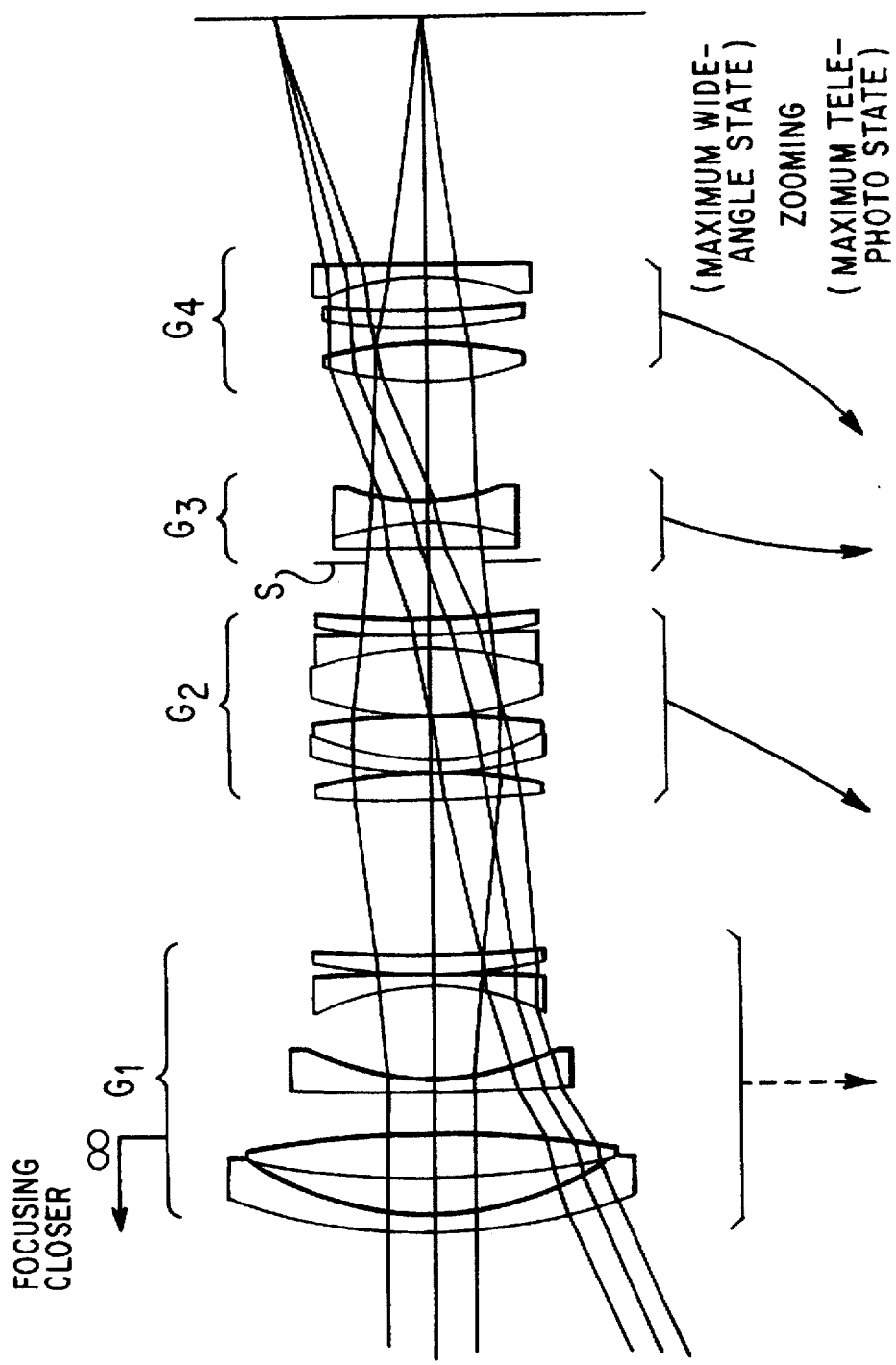
FIG. 2 is a drawing showing the lens composition of a zoom lens according to a first embodiment of the present invention.
Figure 3A:
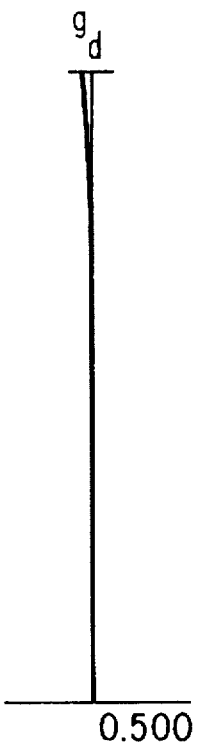
FIGS. 3A–3D show various aberration diagrams for the infinite focus state at the maximum wide-angle state in the first embodiment.
Figure 3B:
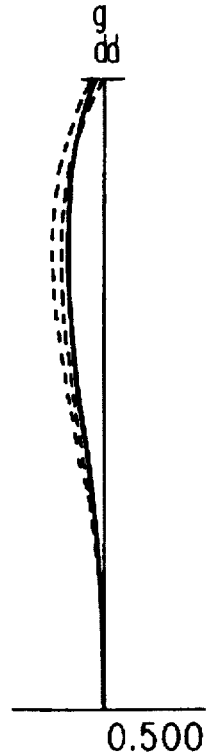
Figure 3C:
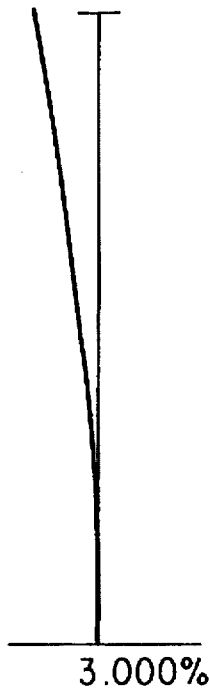
Figure 3D:
Figure 4A:
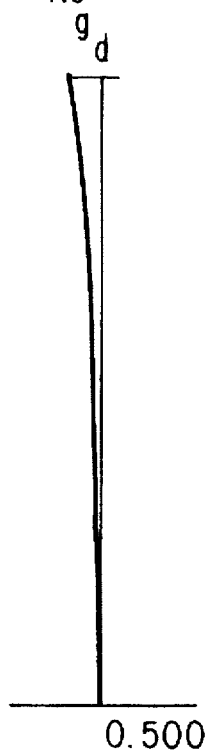
FIGS. 4A–4D show various aberration diagrams for the infinite focus state at the medium focal length state in the first embodiment.
Figure 4B:
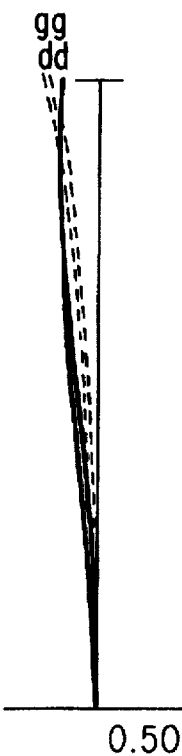
Figure 4C:
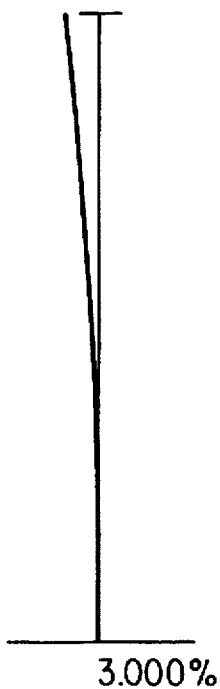
Figure 4D:
Figure 5A:
FIGS. 5A–5D show various aberration diagrams for the infinite focus state at the maximum telephoto state in the first embodiment.
Figure 5B:
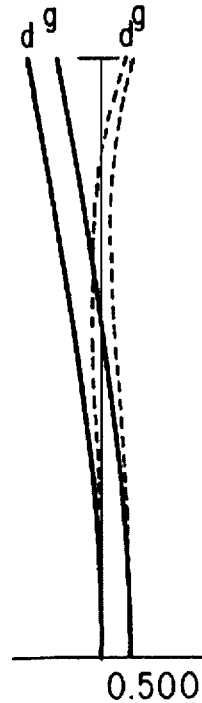
Figure 5C:
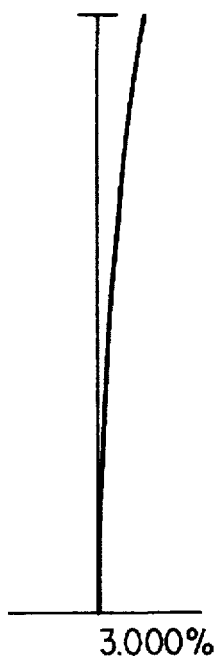
Figure 5D:
Figure 6A:
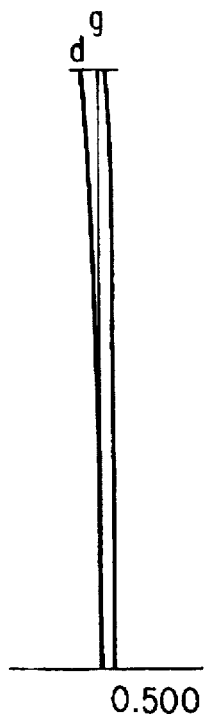
FIGS. 6A–6D show various aberration diagrams for the ultra-close range focus state at the maximum wide-angle state in the first embodiment.
Figure 6B:
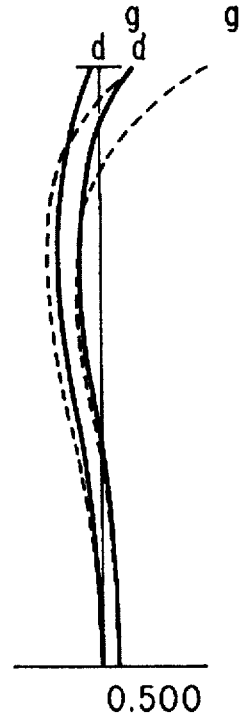
Figure 6C:
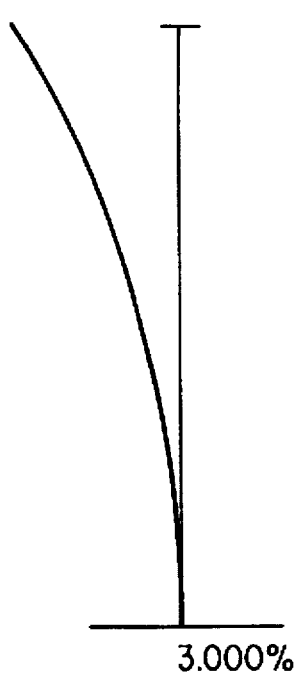
Figure 6D:
Figure 7A:
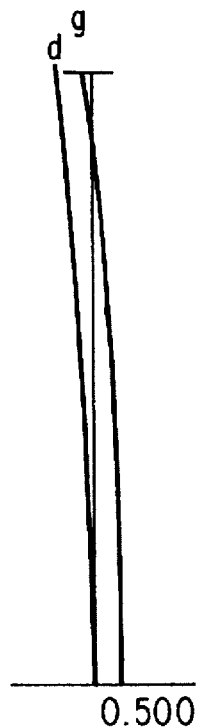
FIGS. 7A–7D show various aberration diagrams for the ultra-close range focus state at the medium focal length state in the first embodiment.
Figure 7B:
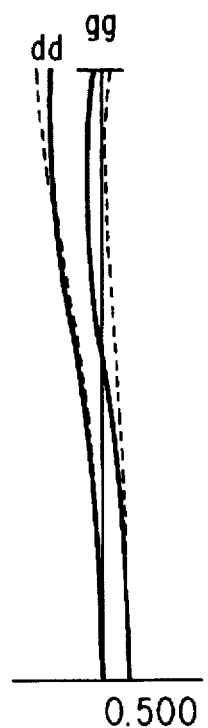
Figure 7C:
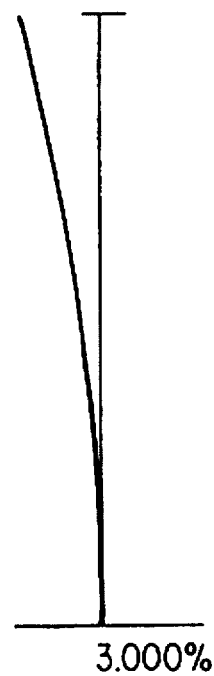
Figure 7D:
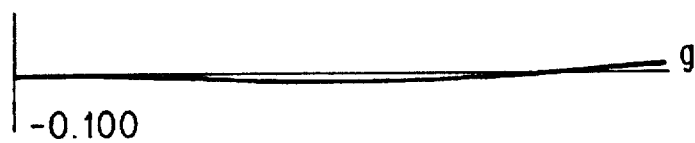
Figure 8A:
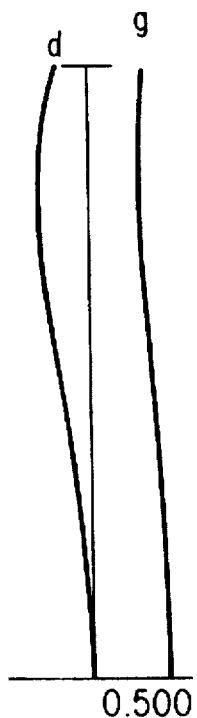
FIGS. 8A–8D show various aberration diagrams for the ultra-close range focus state at the maximum telephoto state in the first embodiment.
Figure 8B:
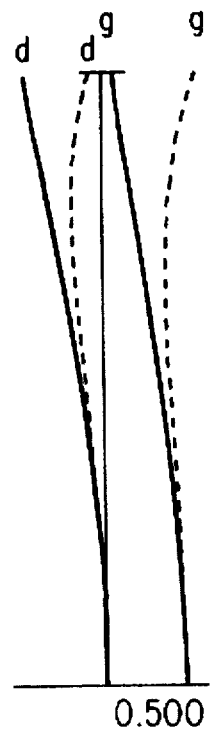
Figure 8C:
Figure 8D:
Figure 9:
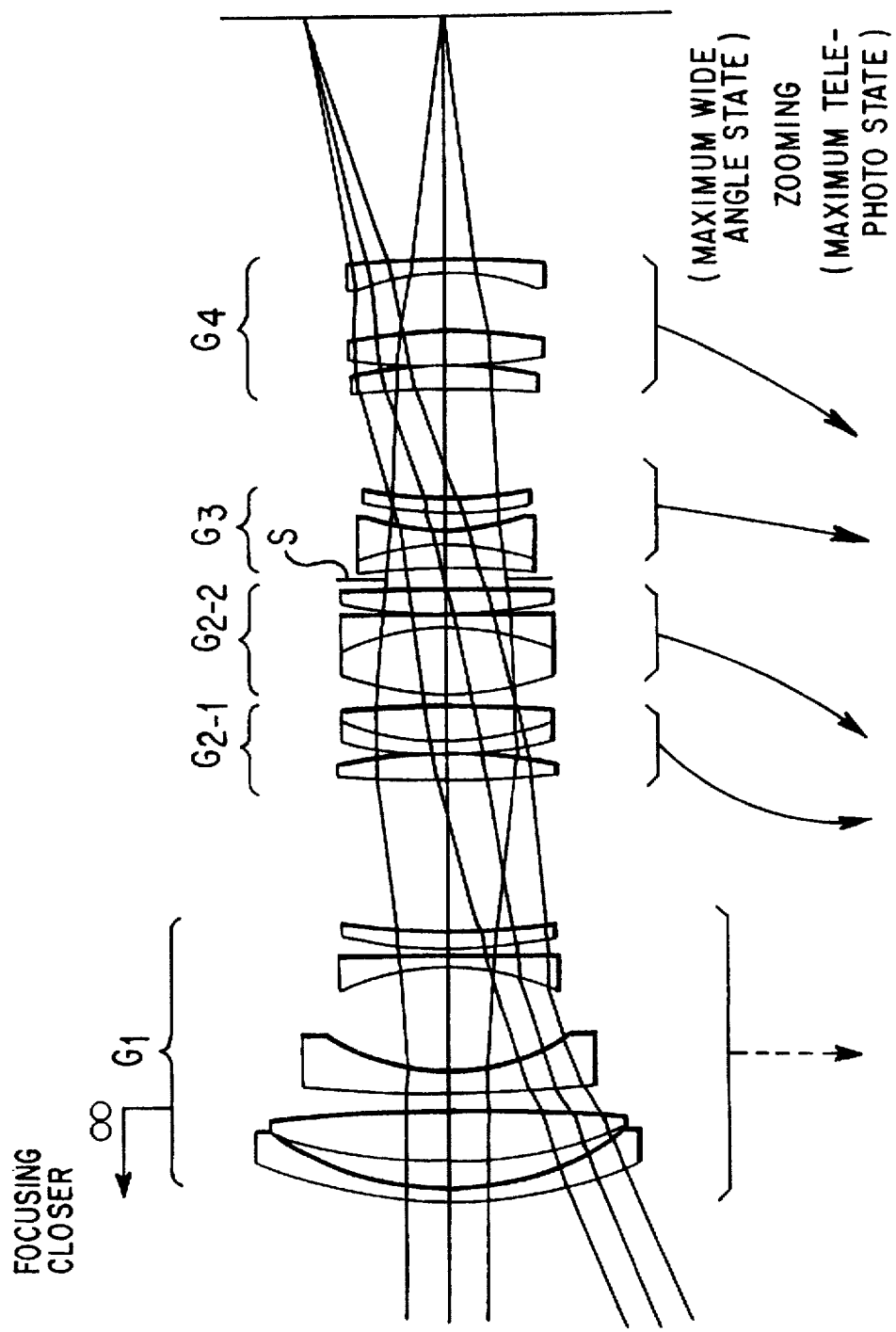
FIG. 9 is a drawing showing the lens composition of a zoom lens according to a second embodiment of the present invention.
Figure 10A:
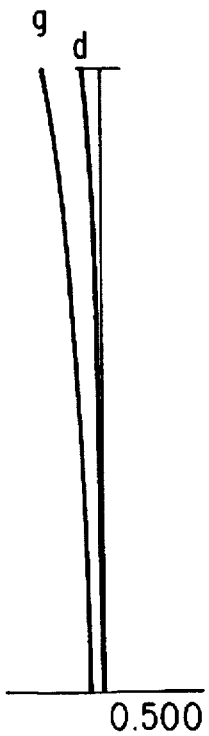
FIGS. 10A–10D show various aberration diagrams for the infinite focus state at the maximum wide-angle state in the second embodiment.
Figure 10B:
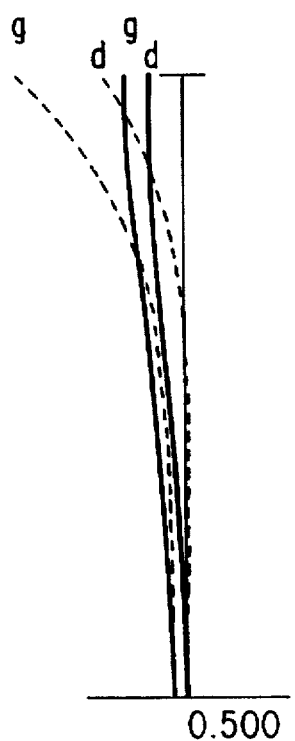
Figure 10C:
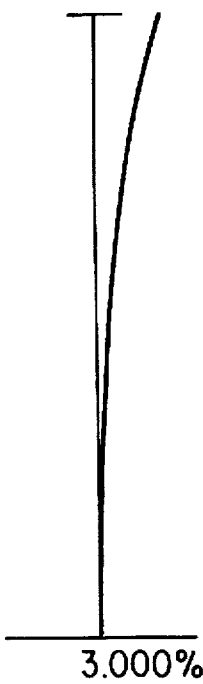
Figure 10D:
Figure 11A:
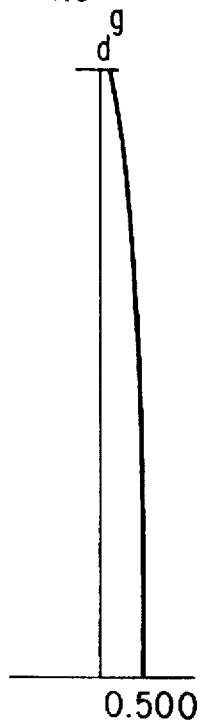
FIGS. 11A–11D show various aberration diagrams for the infinite focus state at the medium focal length state in the second embodiment.
Figure 11B:
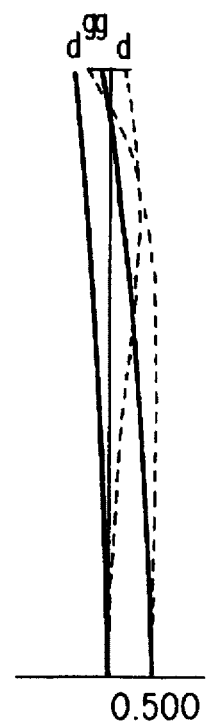
Figure 11C:
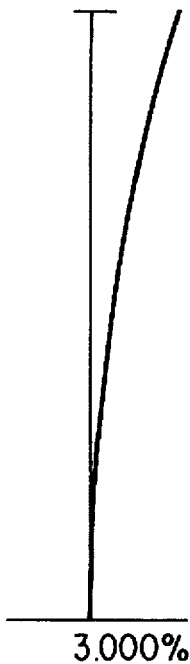
Figure 11D:
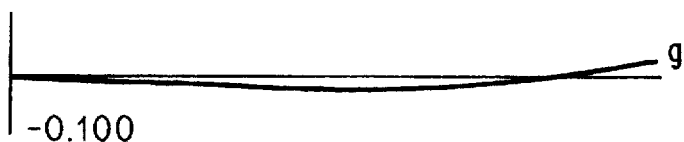
Figure 12A:
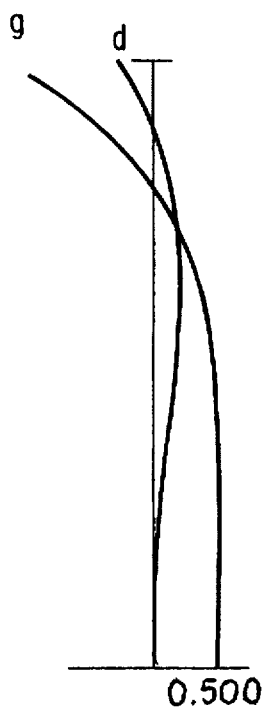
FIG. 12A–12D show various aberration diagrams for the infinite focus state at the maximum telephoto state in the second embodiment.
Figure 12B:
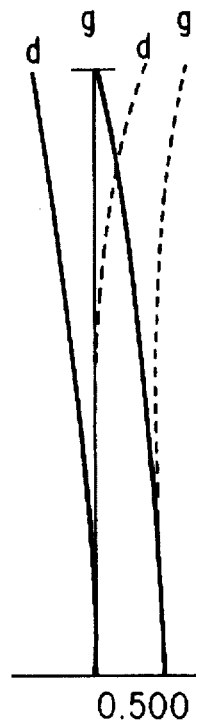
Figure 12C:
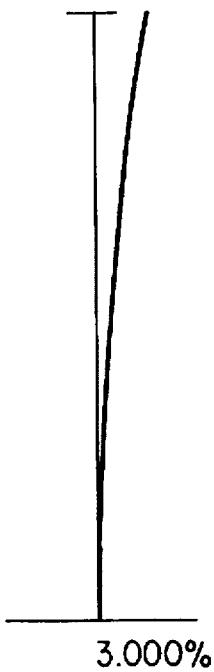
Figure 12D:
Figure 13A:
FIG. 13A–13D show various aberration diagrams for the ultra-close range focus state at the maximum wide-angle state in the second embodiment.
Figure 13B:
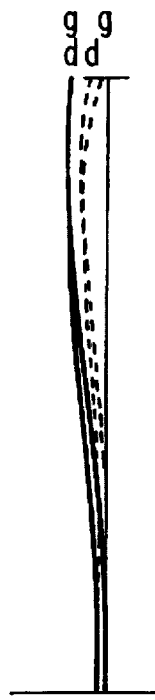
Figure 13C:
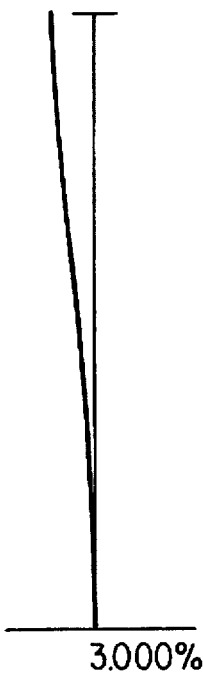
Figure 13D:
Figure 14A:
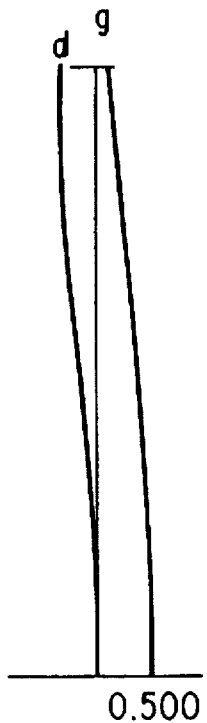
FIG. 14A–14D show various aberration diagrams for the ultra-close range focus state at the medium focal length state in the second embodiment.
Figure 14B:
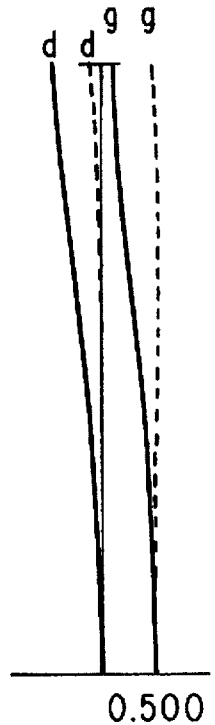
Figure 14C:
Figure 14D:
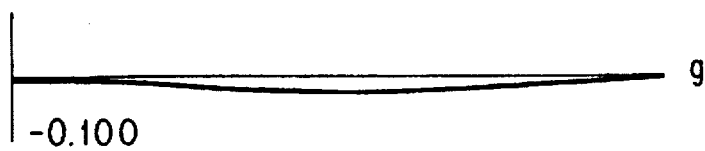
Figure 15A:
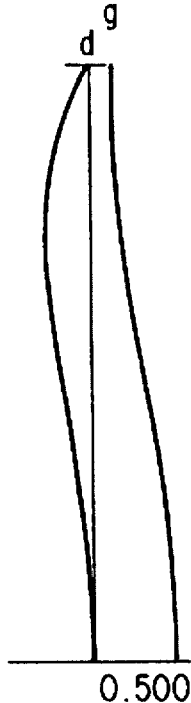
FIGS. 15A–15D show various aberration diagrams for the ultra-close range focus state at the maximum telephoto state in the second embodiment.
Figure 15B:
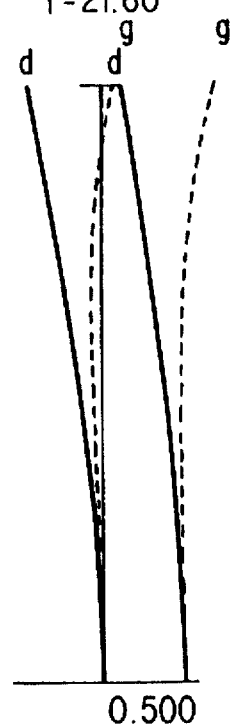
Figure 15C:
Figure 15D:

Hereafter, the embodiments of the invention will be described. FIG. 2 and FIG. 9 show lens composition diagrams for the first and second embodiments, respectively. In each embodiment, the zoom lens comprises, in the following order, from the object side: a first lens group $G_1$ having a negative refractive power; a second lens group $G_2$ having a positive refractive power; a third lens group $G_3$ having a negative refractive power; and a fourth lens group $G_4$ having a positive refractive power.

Zooming from the maximum wide-angle state to the maximum telephoto state is accomplished with the first lens group in a fixed state, the distance between the first lens group and the second lens group decreasing, the distance between the second lens group and the third lens group increasing, and the distance between the third lens group and the fourth lens group decreasing. In addition, focusing from an object at infinity to a close object is accomplished by moving the first lens group toward the object.

With the first embodiment, the second lens group $G_2$, the third lens group $G_3$ and the fourth lens group $G_4$ all move toward the object side when zooming from the maximum wide-angle state to the maximum telephoto state.

On the other hand, in the second embodiment, a variable air distance is provided in the second lens group $G_2$ during zooming, and the second lens group $G_2$ comprises a positive number 2-1 lens group $G_{2-1}$ (first subgroup) and a positive number 2—2 lens group $G_{2-2}$ (second subgroup). In addition, the number 2-1 lens group $G_{2-1}$, the number 2—2 lens group $G_{2-2}$, the third lens group $G_3$ and the fourth lens group $G_4$ all move toward the object during zooming from the maximum wide-angle state to the maximum telephoto state.

The values of various dimensions of the first and second embodiments are respectively listed in Table 1 and Table 2 below. In the Overall Dimensions, f denotes focal length, F denotes F-number, and 2ω denotes the field angle. In the Lens Dimensions, the first column is the number of the lens surface from the object side, the second column r is the radius of curvature of the lens surface, the third column d is the lens surface spacing, the fourth column ν is the value of the Abbe number corresponding to a d-line (λ=587.6 nm), the fifth column n is the value of the refractive index corresponding to a d-line, and the sixth column is the lens group number. In the Lens Dimensions and the Zooming Data, B.f. denotes back focus. In the Zooming Data for Ultra-Close Range Photography, β denotes the photographic magnification.

In addition, the values of the parameters in each condition equation in each embodiment are shown in Table 3.

TABLE 1

Overall Dimensions
f = 51.40 -- 70.00 -- 97.00
F/4.0
2ω = 46.3 -- 24.8°
Lens Dimensions

| No. | r | d | ν | n | |
| --- | --- | --- | --- | --- | --- |
| 1 | 85.1201 | 2.4000 | 60.82 | 1.56384 | $G_1$ |
| 2 | 44.1926 | 6.2015 | | | |
| 3 | 132.45366 | 6.4078 | 33.90 | 1.80384 | $G_1$ |
| 4 | −177.3884 | 6.5090 | | | |
| 5 | 370.0285 | 2.0000 | 45.42 | 1.79668 | $G_1$ |
| 6 | 41.0081 | 14.1705 | | | |
| 7 | −37.4824 | 1.8000 | 70.24 | 1.48749 | $G_1$ |
| 8 | −387.0170 | 0.10000 | | | |
| 9 | 90.2587 | 2.9464 | 23.00 | 1.86074 | $G_1$ |
| 10 | 248.8498 | $d_{10}$ | | | |
| 11 | 306.4520 | 3.9535 | 70.24 | 1.48749 | $G_2$ |
| 12 | −84.3103 | 0.1000 | | | |
| 13 | 58.2272 | 2.0000 | 25.49 | 1.80458 | $G_2$ |
| 14 | 39.6512 | 6.3123 | 70.24 | 1.48749 | $G_2$ |
| 15 | −154.0806 | 0.10000 | | | |
| 16 | 46.8104 | 10.4570 | 70.24 | 1.48749 | $G_2$ |
| 17 | −51.1195 | 1.8000 | 25.49 | 1.80458 | $G_2$ |
| 18 | 238.8114 | 0.1000 | | | |
| 19 | 82.5743 | 2.4888 | 40.77 | 1.58144 | $G_2$ |
| 20 | 163.6888 | $d_{20}$ | | | |
| 21 | diaphragm | 2.0000 | | | |
| 22 | −533.2237 | 3.8739 | 23.00 | 1.86074 | $G_3$ |
| 23 | −40.3229 | 2.9772 | 61.18 | 1.58913 | $G_3$ |
| 24 | 32.1246 | $d_{24}$ | | | |
| 25 | 46.8185 | 5.9217 | 60.67 | 1.60311 | $G_4$ |
| 26 | −55.1505 | 2.3230 | | | |
| 27 | 75.8824 | 2.7158 | 40.37 | 1.60717 | $G_4$ |
| 28 | 228.0132 | 4.5934 | | | |
| 29 | −41.4005 | 1.8000 | 25.49 | 1.80458 | $G_4$ |
| 30 | −812.6967 | B.f. | | | |

Zooming Data for Infinite State Photography

| | maximum wide-angle state | intermediate position | maximum telephoto state |
| --- | --- | --- | --- |
| f | 51.3979 | 69.9986 | 97.0009 |
| $d_{10}$ | 23.4400 | 9.9471 | 1.5969 |
| $d_{20}$ | 8.9961 | 11.2133 | 14.5035 |
| $d_{24}$ | 18.4119 | 14.7629 | 2.3738 |
| B.f. | 38.0508 | 52.9777 | 70.4306 |

Zooming Data for Ultra-Close Range Photography
(Object distance R = 316.6593)

| | maximum wide-angle state | maximum wide-angle state | intermediate position | maximum telephoto state |
| --- | --- | --- | --- | --- |
| β | | −0.2649 | −0.3608 | −0.5000 |
| $d_{10}$ | | 38.4400 | 24.9472 | 16.5969 |
| $d_{20}$ | | 8.9961 | 11.2133 | 14.5035 |
| $d_{24}$ | | 18.4119 | 14.7629 | 2.3738 |
| B.f. | | 38.0508 | 52.9777 | 70.4306 |

TABLE 2

Overall Dimensions
f = 51.40 — 70.00 — 97.93
F/4.1
2ω = 44.8 — 24.8°
Lens Dimensions

| No. | r | d | ν | n | |
|---|---|---|---|---|---|
| 1 | 71.7883 | 1.8000 | 60.82 | 1.56384 | $G_1$ |
| 2 | 44.4382 | 4.2467 | | | |
| 3 | 76.2619 | 7.7875 | 33.90 | 1.80384 | $G_1$ |
| 4 | -324.1666 | 3.0561 | | | |
| 5 | 246.0787 | 3.6159 | 45.42 | 1.79668 | $G_1$ |
| 6 | 33.6151 | 16.3862 | | | |
| 7 | -37.9973 | 1.8000 | 70.24 | 1.48749 | $G_1$ |
| 8 | -1007.1910 | 1.2338 | | | |
| 9 | 65.0019 | 2.6418 | 23.00 | 1.86074 | $G_1$ |
| 10 | 99.1667 | $d_{10}$ | | | |
| 11 | 339.2410 | 4.0252 | 70.24 | 1.48749 | $G_{2-1}$ |
| 12 | -67.6902 | 0.1000 | | | |
| 13 | 65.3700 | 1.8000 | 25.49 | 1.80458 | $G_{2-1}$ |
| 14 | 40.8771 | 5.5029 | 70.24 | 1.48749 | $G_{2-1}$ |
| 15 | -234.2680 | $d_{15}$ | | | |
| 16 | 45.5942 | 10.4570 | 70.24 | 1.48749 | $G_{2-2}$ |
| 17 | -39.4738 | 1.8000 | 25.49 | 1.80458 | $G_{2-2}$ |
| 18 | 751.2229 | 0.3880 | | | |
| 19 | 82.5743 | 3.6010 | 40.77 | 1.58144 | $G_{2-2}$ |
| 20 | -261.3018 | $d_{20}$ | | | |
| 21 | diaphragm | 2.0000 | | | |
| 22 | -140.7183 | 3.6230 | 23.00 | 1.86074 | $G_3$ |
| 23 | -37.0447 | 1.8207 | 61.18 | 1.58913 | $G_3$ |
| 24 | 34.4894 | 3.1623 | | | |
| 25 | 48.5305 | 2.0359 | 50.28 | 1.72000 | $G_3$ |
| 26 | 54.9193 | $d_{26}$ | | | |
| 27 | -270.2482 | 3.6673 | 60.67 | 1.60311 | $G_4$ |
| 28 | -54.6303 | 0.1000 | | | |
| 29 | 96.2988 | 4.9876 | 40.37 | 1.60717 | $G_4$ |
| 30 | -73.5502 | 8.8708 | | | |
| 31 | -40.3332 | 1.8000 | 25.49 | 1.80458 | $G_4$ |
| 32 | -212.0228 | B.f. | | | |

Zooming Data for Infinite State Photography

| | maximum wide-angle state | intermediate position | maximum telephoto state |
|---|---|---|---|
| f | 51.4007 | 70.0013 | 96.9301 |
| $d_{10}$ | 23.8208 | 10.2367 | 1.0000 |
| $d_{15}$ | 1.8617 | 11.4118 | 1.0000 |
| $d_{20}$ | 1.3739 | 6.3835 | 7.2352 |
| $d_{26}$ | 17.5340 | 5.9946 | 3.0405 |
| B.f. | 38.0115 | 48.5748 | 70.2568 |

Zooming Data for Ultra-Close Range Photography
(Object distance R = 314.8000)

| | maximum wide-angle state | intermediate position | maximum telephoto state |
|---|---|---|---|
| β | -0.2654 | -0.3614 | -0.5003 |
| $d_{10}$ | 37.8470 | 24.2629 | 15.0208 |
| $d_{15}$ | 1.8617 | 11.4118 | 1.0000 |
| $d_{20}$ | 1.3739 | 6.3835 | 7.2352 |
| $d_{26}$ | 17.5340 | 5.9946 | 3.0405 |
| B.f. | 38.0115 | 48.5748 | 70.2568 |

TABLE 3

| EMBODIMENT | | 1 | 2 |
|---|---|---|---|
| (1) | $|f_1/f_w|$ | 1.049 | 1.014 |
| (2) | $f_t/f_{12t}$ | 0.864 | 1.302 |
| (3) | $h_{2w}/h_{1w}$ | 0.712 | 0.590 |
| (4) | $f_4/f_w$ | 1.298 | 1.782 |

FIG. 3, FIG. 4 and FIG. 5 respectively show various aberration diagrams for the infinite focus state in the first embodiment at the maximum wide-angle state, the medium focal length state and the maximum telephoto state, while FIG. 6, FIG. 7 and FIG. 8 respectively show various aberration diagrams for the ultra-close range photography state in the first embodiment at the maximum wide-angle state, the medium focus lens state and the maximum telephoto state. In addition, FIG. 10, FIG. 11 and FIG. 12 respectively show various aberration diagrams for the infinite focus state in the second embodiment at the maximum wide-angle state, the medium focal length state and the maximum telephoto state, while FIG. 13, FIG. 14 and FIG. 15 respectively show various aberration diagrams for the ultra-close range photography state in the second embodiment at the maximum wide-angle state, the medium focus lens state and the maximum telephoto state.

In each of the aberration diagrams, $F_{NO}$ denotes F number, NA denotes numerical aperture, Y denotes image height, d denotes a d-line (λ=587.6 nm) and g denotes a g-line (λ=435.6 nm). In the aberration diagrams showing astigmatism, the solid line represents the sagittal image plane while the broken line represents the meridional image plane.

From each of the aberration diagrams, it is clear that each of the embodiments corrects the various aberrations well and has superior imaging performance.

The invention has been described with reference to preferred embodiments thereof, which are illustrative and not limiting. Various changes may be made without departing from the spirit and scope of the invention as defined in the appended claims.

What is claimed is:

1. A zoom lens comprising, in the following order, from an object side: a first lens group having a negative refractive power; a second lens group having a positive refractive power; a third lens group having a negative refractive power; and a fourth lens group having a positive refractive power, wherein zooming from a maximum wide-angle state to a maximum telephoto state is accomplished with the first lens group in a fixed state, a distance between the first lens group and the second lens group decreasing, a distance between the second lens group and the third lens group increasing, and a distance between the third lens group and the fourth lens group decreasing, further wherein focusing from an object at infinity to a close object is accomplished by moving the first lens group toward the object, and satisfying the equations:

$$0.6 < |f_1/f_w| < 1.2 \quad (1)$$

$$0.7 < f_t/f_{12t} < 1.5 \quad (2)$$

where $f_w$ is the focal length of the entire zoom lens at the maximum wide-angle state in an infinite focus state, $f_t$ is the focal length of the entire zoom lens at the maximum telephoto state in an infinite focus state, $f_1$ is the focal length of the first lens group, and $f_{12t}$ is the combined focal length of the first lens group and the second lens group at the maximum telephoto state in an infinite focus state.

2. The zoom lens of claim 1, wherein the second lens group comprises, in the following order from the object side, a first lens subgroup having a positive refractive power and a second lens subgroup having a positive refractive power, wherein when zooming from the maximum wide-angle state to the maximum telephoto state, the distance between the first lens subgroup and the second lens subgroup is caused to change.

3. The zoom lens of claim 1, wherein the equation:

$$0.4 < h_{2w}/h_{1w} < 0.9 \quad (3)$$

is satisfied, where $h_{1w}$ is the height of principal light rays having the largest field angle from an optical axis that passes through a surface of the first lens group closest to an image side at the maximum wide-angle state in an infinite focus state, and $h_{2w}$ is the height of principal light rays having the largest field angle from an optical axis that passes through a surface of the second lens group closest to the object side at the maximum wide-angle state in an infinite focus state.

4. The zoom lens of claim 1, wherein the condition equation:

$$1.0 < f_4/f_w < 2.0 \quad (4)$$

is satisfied, where $f_4$ is the focal length of the fourth lens group.

5. The zoom lens of claim 1, wherein a maximum photographic magnification is about −0.5.

6. The zoom lens of claim 1, wherein a zoom magnification ratio is about 2.

7. The zoom lens of claim 1, wherein a F number of the zoom lens is about F/4.

8. A zoom lens comprising, in the following order, from the object side: a first lens group having a negative refractive power; a second lens group having a first lens subgroup with a positive refractive power and a second lens subgroup with a positive refractive power; a third lens group having a negative refractive power; and a fourth lens group having a positive refractive power, wherein zooming from a maximum wide-angle state to a maximum telephoto state is accomplished with the first lens group in a fixed state, a distance between the first lens group and the first lens subgroup decreasing, a distance between the first lens subgroup and the second lens subgroup being caused to change, a distance between the second lens subgroup and the third lens group increasing, and a distance between the third lens group and the fourth lens group decreasing, further wherein focusing from an object at infinity to a close object is accomplished by moving the first lens group toward the object.

9. The zoom lens of claim 8, wherein a maximum photographic magnification is about −0.5.

10. The zoom lens of claim 8, wherein a zoom magnification ratio is about 2.

11. The zoom lens of claim 8, wherein a F number of the zoom lens is about F/4.

* * * * *